(Model.)
J. W. LOGAN & E. KELSEY.
Windmill.
No. 243,586.          Patented June 28, 1881.
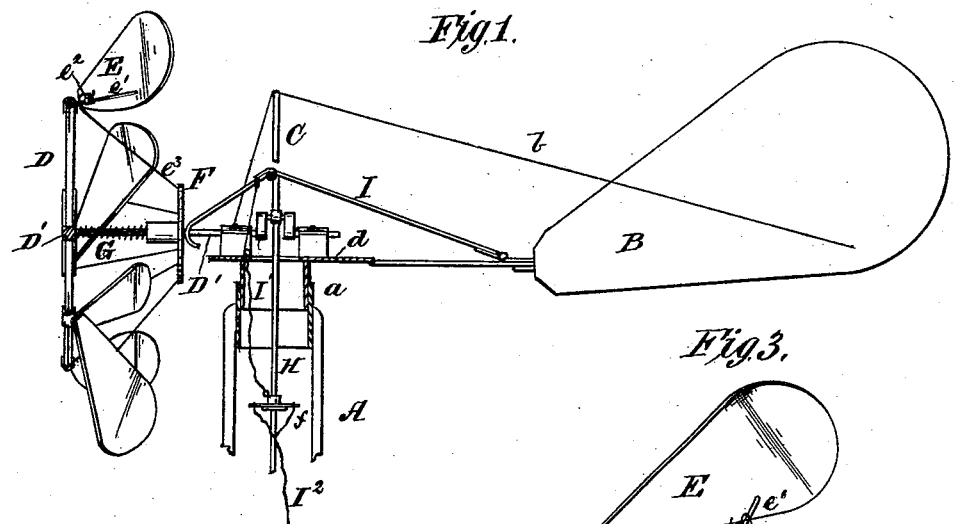
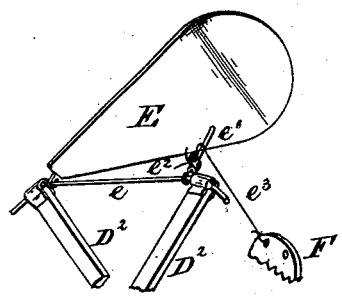
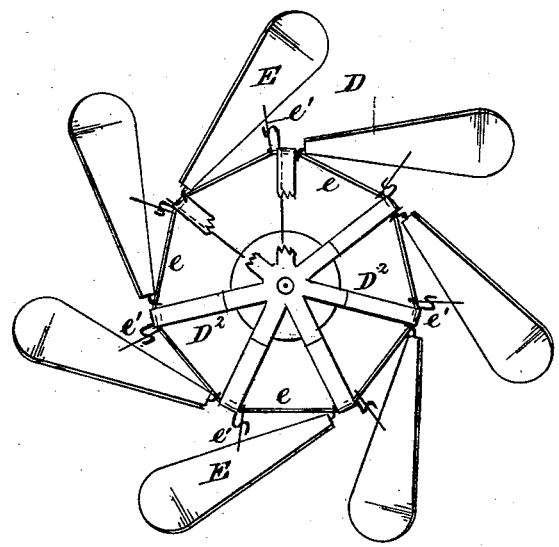
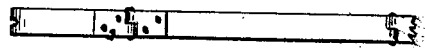
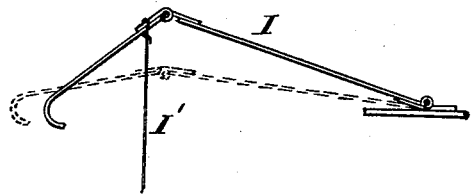
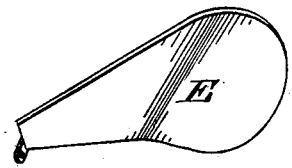
Witnesses:
M. M. Lacey
A. Parker.
Inventors:
James W. Logan
Edwin Kelsey
By R. S. & A. P. Lacey Attys.
N. PETERS, Photo-Lithographer, Washington, D. C.

UNITED STATES PATENT OFFICE.

JAMES W. LOGAN AND EDWIN KELSEY, OF NORTON, KANSAS.

WINDMILL.

SPECIFICATION forming part of Letters Patent No. 243,586, dated June 28, 1881.

Application filed March 23, 1881. (Model.)

*To all whom it may concern:*

Be it known that we, JAMES W. LOGAN and EDWIN KELSEY, citizens of the United States, residing at Norton, in the county of Norton and State of Kansas, have invented certain new and useful Improvements in Wind-Wheels; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification, and in which—

Figure 1 is a side elevation of our invention, and Figs. 2, 3, 4, and 5 are detail views thereof.

This invention relates to improvements in windmills, its object being to provide more particularly for the ready and easy adjustment of the wings or vanes of the wheel for presenting them to and taking them out of the wind; and the nature of this invention consists in the combination and arrangement of mechanism, substantially as hereinafter more fully set forth.

Referring to the accompanying drawings, A indicates the upright supporting frame or pedestal, with a telescopic jointed cylinder, $a$, in its upper end, to which the tail B is connected, as shown, or otherwise. This tail is braced in position by wires or rods $b$, carried over and fastened upon a bridge or frame, C, fastened to the cylinder $a$. These wires are fastened at their outer ends to the tail B and at their opposite ends to one of the bearings of the wheel-shaft or other convenient point. This constitutes a light and strong brace and support for the tail.

D is the wheel, fastened to a shaft, $D'$, with its bearing in suitable bearing-blocks fastened upon a platform or table, $d$, of the cylinder $a$. The radial spokes or arms $D^2$ of the wheel D are connected together at their outer ends by a wire, $e$, upon each section of which, between the respective spokes, is hung, at one end, a vane or wing, E, arranged to stand obliquely to the periphery of the wheel. Each vane or wing is further connected by an eye-rod, $e'$, to the wire $e$, near its outer end. The intended or preferable form of the vanes or wings is that shown in Fig. 5, somewhat after the form of a volute curve, to enable them to better catch or receive the force of the wind. The eye-rods $e'$ are provided with staples or eyes $e^2$, which receive the upper ends of rods $e^3$, the opposite ends of which are connected to the disk or tubular plate F, fitted to slide upon the wheel-shaft $D'$. A spring, G, is coiled around the said shaft, between the wheel and the tube or sleeve of the plate or disk, the action of which holds the vanes or wings in an extended position with relation to the periphery of the wheel, to catch the force of the wind and cause the wheel to revolve and drive its shaft. The ends of the rods $e^3$, which connect with the vane-rods $e'$, are of an approximate S shape, to cause the vanes or wings to have a partial rotary motion, as they are extended and contracted, to take them into and out of the wind.

To the crank of the shaft $D'$ is connected a pitman, H, which reaches down and is adapted in practice to be connected to the machinery to be operated.

I is a jointed bar or rod, with one end hinged to the tail-bar, while its other end is forked upon the wheel-shaft and rests against the plate or disk F, its position, when the vanes are presented to the wind, being that shown in Fig. 1, or flexed upwardly. A chain or other manipulating medium, $I'$, connected to the jointed rod or bar, is connected to a sleeve, $f$, upon the pitman H, to which is attached a chain or wire or rope, $I^2$, reaching down within convenient grasp or distance of the attendant.

It will be noticed that by pulling upon the wire or rope $I^2$ the jointed rod or bar I will be more or less straightened, or straightened throughout, according to the force applied to the rope, which will act upon the plate F and compress its spring, causing the arms or rods $e^3$ to partially revolve and present the convex surfaces of the vanes to the wind, to break its force upon them, and thus stop the wheel. When force is removed from the wire or rope $I^2$, the vanes will spring open and receive the force of the wind upon their concave surfaces, and thus rotate the wheel and drive the shaft. The tail, with the telescopic jointed cylinder supporting the wheel and its shaft, permits the wheel to be automatically shifted with the direction of the wind.

Having thus fully described our invention, we claim and desire to secure by Letters Patent—

1. In a windmill, the wheel with its spokes connected together by a peripheral wire or rods, in combination with the oblique vanes or wings hinged thereto, and having eye-rods, connecting them to the peripheral wire, rods or arms connecting the said eye-rods to the spring tubular plate sliding upon the wheel-shaft, the latter rods or arms having approximate S-shaped ends, substantially as and for the purpose set forth.

2. In a windmill, the combination of the wheel having a series of radial arms or spokes, a peripheral rod or wire carried around and attached to the outer ends of the spokes, and a series of curved vanes, set obliquely to the rear of the plane of the wheel, and fixed on the peripheral rod, so that they turn freely forward or back, to bring them out of or into the wind, and operated substantially as set forth.

In testimony whereof we affix our signatures in presence of two witnesses.

JAMES W. LOGAN.
EDWIN KELSEY.

Witnesses:
  M. W. PETTIGREW,
  J. R. C. STATLER.